United States Patent
Karkow et al.

(10) Patent No.: US 10,801,723 B2
(45) Date of Patent: Oct. 13, 2020

(54) PREFABRICATED INTEGRATED COMBUSTION ASSEMBLIES AND METHODS OF INSTALLING THE SAME INTO A COMBUSTION SYSTEM

(71) Applicant: CLEARSIGN TECHNOLOGIES CORPORATION, Seattle, WA (US)

(72) Inventors: Douglas Wayne Karkow, Mount Vernon, IA (US); Joseph Colannino, Oceanside, CA (US); Christopher A. Wiklof, Everett, WA (US)

(73) Assignee: CLEARSIGN TECHNOLOGIES CORPORATION, Seattle, WA (US)

( * ) Notice: Subject to any disclaimer, the term of this patent is extended or adjusted under 35 U.S.C. 154(b) by 359 days.

(21) Appl. No.: 15/549,957

(22) PCT Filed: Feb. 16, 2016

(86) PCT No.: PCT/US2016/018133
§ 371 (c)(1),
(2) Date: Aug. 9, 2017

(87) PCT Pub. No.: WO2016/133936
PCT Pub. Date: Aug. 25, 2016

(65) Prior Publication Data
US 2018/0023810 A1    Jan. 25, 2018

Related U.S. Application Data

(60) Provisional application No. 62/117,401, filed on Feb. 17, 2015.

(51) Int. Cl.
*F23N 5/18* (2006.01)
*F23N 5/00* (2006.01)
(Continued)

(52) U.S. Cl.
CPC ............ *F23N 5/18* (2013.01); *B23P 19/04* (2013.01); *F23D 99/00* (2013.01); *F23N 5/00* (2013.01);
(Continued)

(58) Field of Classification Search
CPC .............. F23D 14/14; F23N 5/00; F23N 5/18
(Continued)

(56) References Cited

U.S. PATENT DOCUMENTS 3,021,893 A * 2/1962 Honger ................. F23D 14/145
431/329
3,488,137 A * 1/1970 Naganuma ........... F23D 14/145
431/329
(Continued)

FOREIGN PATENT DOCUMENTS

WO    2014127305 A1    8/2014
WO    2014127307 A1    8/2014
(Continued)

OTHER PUBLICATIONS

Fric, Thomas F., "Effects of Fuel-Air Unmixedness on NOx Emissions," Sep.-Oct. 1993. Journal of Propulsion and Power, vol. 9, No. 5, pp. 708-713.
(Continued)

*Primary Examiner* — Grant Moubry
*Assistant Examiner* — Aaron H Heyamoto
(74) *Attorney, Agent, or Firm* — Dorsey & Whitney LLP

(57) ABSTRACT

Embodiments disclosed herein are directed to devices and methods for improving operation of a combustion system. According to various embodiments disclosed herein, a prefabricated integrated combustion assembly is disclosed that may be installed into a combustion chamber of a combustion system. The combustion system may be a new combustion
(Continued)

system that is being manufactured or a conventional combustion system that is being retrofitted.

20 Claims, 7 Drawing Sheets

(51) Int. Cl.
  *F23D 99/00* (2010.01)
  *B23P 19/04* (2006.01)
(52) U.S. Cl.
  CPC .... *F23N 5/187* (2013.01); *F23D 2900/00017* (2013.01); *F23N 2005/185* (2013.01); *F23N 2225/16* (2020.01); *F23N 2229/04* (2020.01)
(58) Field of Classification Search
  USPC ......................................................... 431/328
  See application file for complete search history.

(56) References Cited

U.S. PATENT DOCUMENTS

| | | | |
|---|---|---|---|
| 4,021,188 A | 5/1977 | Yamagishi et al. | |
| 4,081,958 A | 4/1978 | Schelp | |
| 4,408,461 A | 10/1983 | Bruhwiler et al. | |
| 4,473,349 A | 9/1984 | Kumatsu | |
| 4,519,770 A | 5/1985 | Kesselring et al. | |
| 4,588,373 A | 5/1986 | Tonon et al. | |
| 4,673,349 A | 6/1987 | Abe et al. | |
| 4,726,767 A | 2/1988 | Nakajima | |
| 4,752,213 A * | 6/1988 | Grochowski | F23D 14/02 431/328 |
| 4,773,847 A | 9/1988 | Shukla et al. | |
| 5,326,257 A | 7/1994 | Taylor et al. | |
| 5,375,999 A | 12/1994 | Aizawa et al. | |
| 5,429,059 A | 7/1995 | Wagoner et al. | |
| 5,441,402 A | 8/1995 | Reuther et al. | |
| 5,511,974 A | 4/1996 | Gordon et al. | |
| 5,641,282 A | 6/1997 | Lee et al. | |
| 5,649,529 A | 7/1997 | Lu et al. | |
| 5,957,682 A | 9/1999 | Kamal et al. | |
| 6,095,798 A | 8/2000 | Mitani et al. | |
| 6,159,001 A | 12/2000 | Kushch et al. | |
| 6,206,686 B1 | 3/2001 | Nieszczur et al. | |
| 6,270,336 B1 | 8/2001 | Terashima et al. | |
| 8,327,538 B2 | 12/2012 | Wang et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 9,562,682 B2 | 2/2017 | Karkow et al. | |
| 2006/0141413 A1 | 6/2006 | Masten et al. | |
| 2012/0017847 A1 | 1/2012 | Ruiz et al. | |
| 2012/0164590 A1 * | 6/2012 | Mach | F23D 14/145 431/328 |
| 2012/0231398 A1 | 9/2012 | Carpentier et al. | |
| 2014/0004471 A1 * | 1/2014 | Vandergriendt | C04B 7/4446 431/12 |
| 2014/0248570 A1 * | 9/2014 | Zhang | F24C 3/04 431/263 |
| 2014/0295360 A1 | 10/2014 | Wiklof et al. | |
| 2015/0101591 A1 * | 4/2015 | Gulkanat | F24C 3/06 126/39 J |
| 2015/0118629 A1 | 4/2015 | Colannino et al. | |
| 2015/0276217 A1 | 10/2015 | Karkow et al. | |
| 2015/0316261 A1 | 11/2015 | Karkow et al. | |
| 2015/0330625 A1 | 11/2015 | Karkow et al. | |
| 2015/0362177 A1 | 12/2015 | Krichtafovitch et al. | |
| 2015/0362178 A1 | 12/2015 | Karkow et al. | |
| 2015/0369477 A1 | 12/2015 | Karkow et al. | |
| 2016/0003471 A1 | 1/2016 | Karkow et al. | |
| 2016/0018103 A1 | 1/2016 | Karkow et al. | |
| 2016/0025333 A1 | 1/2016 | Karkow et al. | |
| 2016/0025374 A1 | 1/2016 | Karkow et al. | |
| 2016/0025380 A1 | 1/2016 | Karkow et al. | |
| 2016/0046524 A1 | 2/2016 | Colannino et al. | |
| 2016/0091200 A1 | 3/2016 | Colannino et al. | |
| 2016/0230984 A1 | 8/2016 | Colannino et al. | |
| 2016/0238240 A1 | 8/2016 | Colannino et al. | |
| 2016/0238277 A1 | 8/2016 | Colannino et al. | |
| 2016/0238318 A1 | 8/2016 | Colannino et al. | |
| 2016/0276212 A1 | 10/2016 | Rutkowski et al. | |
| 2016/0290639 A1 | 10/2016 | Karkow et al. | |
| 2016/0298838 A1 | 10/2016 | Karkow et al. | |
| 2016/0298840 A1 | 10/2016 | Karkow et al. | |
| 2016/0305660 A1 | 10/2016 | Colannino et al. | |
| 2016/0348899 A1 | 12/2016 | Karkow et al. | |
| 2016/0348900 A1 | 12/2016 | Colannino et al. | |
| 2016/0348901 A1 | 12/2016 | Karkow et al. | |
| 2017/0010019 A1 | 1/2017 | Karkow et al. | |
| 2017/0038063 A1 | 2/2017 | Colannino et al. | |
| 2017/0038064 A1 | 2/2017 | Colannino et al. | |
| 2017/0146232 A1 | 5/2017 | Karkow et al. | |

FOREIGN PATENT DOCUMENTS

| | | |
|---|---|---|
| WO | WO 2015/123149 | 8/2015 |
| WO | WO 2015/123683 | 8/2015 |
| WO | WO 2016/105489 | 6/2016 |
| WO | 2016133934 A1 | 8/2016 |
| WO | 2016133936 A1 | 8/2016 |

OTHER PUBLICATIONS

International Search Report for International Patent Application No. PCT/US2016/018128, dated Apr. 19, 2016 (2 pages).
International Search Report for International Patent Application No. PCT/US2016/018133, dated Apr. 21, 2016 (2 pages).
Written Opinion of the International Searching Authority for International Patent Application No. PCT/US2016/018128, dated Apr. 19, 2016 (7 pages).
Written Opinion of the International Searching Authority for International Patent Application No. PCT/US2016/018133, dated Apr. 21, 2016 (4 pages).

* cited by examiner

PREFABRICATED INTEGRATED COMBUSTION ASSEMBLIES AND METHODS OF INSTALLING THE SAME INTO A COMBUSTION SYSTEM

CROSS-REFERENCE TO RELATED APPLICATION

This application claims priority to U.S. Provisional Application No. 62/117,401 entitled "PREFABRICATED INTEGRATED COMBUSTION ASSEMBLIES AND METHODS OF INSTALLING THE SAME INTO A COMBUSTION SYSTEM", filed on Feb. 17, 2015, the disclosure of which is incorporated herein, in its entirety, by this reference.

BACKGROUND

There are many different types of burners and combustion systems. Generally, a burner or combustion system includes a fuel nozzle that injects fuel into a combustion chamber. The fuel mixes with an oxidant, such as air, and after mixing, the fuel and oxidant mixture is ignited and combusted in the combustion chamber to generate heat. Furthermore, heat generated by the combustion system may be transferred and may raise the temperature of one or more objects and/or materials. For example, heat may be transferred from the combustion system to one or more pipes in a boiler system.

One or more pollutants may be produced during combustion of the fuel. Typically, such pollutants are exhausted into an outside environment and/or atmosphere and may have a negative impact on that environment. In addition, typical combustion systems operate below theoretical maximum efficiency for converting chemical energy of the fuel into heat, which may be transferred to one or more objects or materials that are heated by the combustion system.

Therefore, developers and users of burners and combustion systems continue to seek improvements to operating efficiency thereof and/or production of pollutants thereby.

SUMMARY

Embodiments disclosed herein are directed to devices and methods for improving operation of a combustion system. According to various embodiments disclosed herein, a prefabricated integrated combustion assembly is disclosed that may be installed into a combustion chamber of a combustion system. The combustion system may be a new combustion system that is being manufactured or a conventional combustion system that is being retrofitted.

An embodiment includes a method of installing a prefabricated integrated combustion assembly into a combustion chamber of a combustion system. The method includes inserting the prefabricated integrated combustion assembly into the combustion chamber of the combustion system. The prefabricated integrated combustion assembly includes a mounting plate mountable near a base of the combustion chamber and a fuel nozzle assembly attached to or integrated with the mounting plate. The fuel nozzle assembly includes a fuel nozzle and an oxidant outlet. Moreover, the prefabricated integrated combustion assembly includes one or more supports attached to or integrated with the mounting plate, and a perforated flame holder supported by the one or more supports and including a body defining a plurality of apertures therein. In addition, the method includes attaching the mounting plate of the prefabricated integrated combustion assembly near the base of the combustion chamber.

Embodiments are also directed to a prefabricated integrated combustion assembly to be installed into a combustion system. The prefabricated integrated combustion assembly includes a mounting plate mountable to a base of a combustion chamber of the combustion system and a fuel nozzle assembly attached to or integrated with the mounting plate. The mounting plate includes a mounting face and a back face. The fuel nozzle assembly includes a fuel nozzle having a tip thereof positioned at a predetermined distance from the mounting face of the mounting plate, and an oxidant outlet. The prefabricated integrated combustion assembly further includes one or more supports attached to or integrated with the mounting plate and extending outward from the mounting face thereof. Additionally, the prefabricated integrated combustion assembly includes a perforated flame holder supported by one or more supports. The perforated flame holder includes a body defining a plurality of apertures. Furthermore, the perforated flame holder is positioned at a predetermined distance from the mounting face of the mounting plate and from the tip of the fuel nozzle.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments disclosed herein are directed to devices and methods for improving operation of a combustion system. According to various embodiments disclosed herein, a prefabricated integrated combustion assembly is disclosed that may be installed into a combustion chamber of a combustion system. The combustion system may be a new combustion system that is being assembled or a conventional combustion system that is being retrofitted. The prefabricated integrated combustion assembly includes a mounting plate mountable to a base of the combustion chamber of the combustion system and a fuel nozzle assembly attached to or integrated with the mounting plate. The mounting plate includes a mounting face and a back face. The fuel nozzle assembly includes a fuel nozzle having a tip thereof positioned at a predetermined distance from the mounting face of the mounting plate, and an oxidant outlet. The prefabricated integrated combustion assembly further includes one or more supports attached to or integrated with the mounting plate and extending outward from the mounting face thereof. Additionally, the prefabricated integrated combustion assembly includes a perforated flame holder supported by one or more supports. The perforated flame holder includes a body defining a plurality of apertures. Furthermore, the perforated flame holder is positioned at a predetermined distance from the mounting face of the mounting plate and from the tip of the fuel nozzle.

In some embodiments, the combustion system may exhibit an increased or improved heat transfer therefrom to one or more elements heated thereby. As such, a greater amount of chemical energy stored in a fuel may be converted to heat and transferred to objects and/or materials heated by the retrofitted combustion system. Furthermore, the combustion system may combust the fuel at a lower temperature than a conventional combustion system. Under some operating conditions, by reducing the combustion temperature, the amount of pollutants produced by the retrofitted combustion system also may be reduced (e.g., as compared to the amount of pollutants produced by a conventional combustion system). For example, the combustion system may produce less oxides of nitrogen "$NO_x$" (e.g., NO and/or $NO_2$) than a conventional combustion system (e.g., a system configured to support a conventional diffusion flame). In some embodiments, the combustion system may facilitate a leaner combustion than a conventional combustion system (e.g., the combustion system may sustain a flame from a leaner fuel to oxidant ratio than may be sustained by the conventional combustion system).

Figure 1:
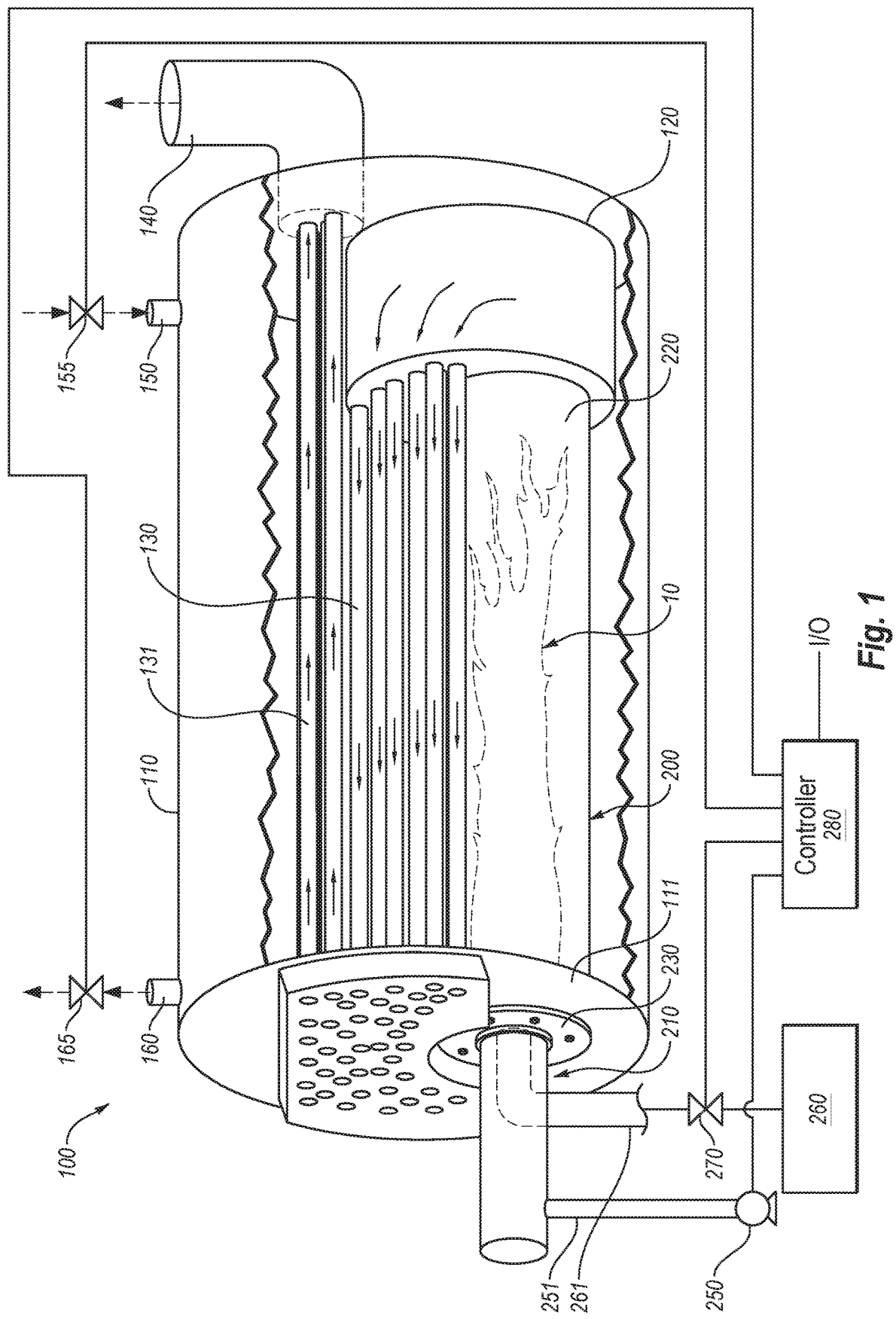
FIG. 1 is an isometric cutaway view of a fire-tube boiler, according to an embodiment.

FIG. 1 is an isometric view of an embodiment of a fire-tube boiler 100 with a cutaway to expose internal elements and components thereof, such as a combustion system 200 at least partially located inside the fire-tube boiler 100, according to an embodiment. Specifically, the combustion system 200 may be positioned inside a shell 110 of the fire-tube boiler 100. The combustion system 200 includes a fuel nozzle assembly 210 that has a fuel nozzle and an oxidant outlet. In particular, the fuel nozzle may inject fuel into a combustion chamber 220 and the oxidant outlet may facilitate flow of and/or force an oxidant into the combustion chamber 220. The fuel and oxidant may mix (e.g., in the combustion chamber 220) and may be ignited and combusted thereafter in the combustion chamber 220. For example, the combustion system 200 may include an ignition device, such as a spark igniter, which may be positioned downstream of the fuel nozzle and oxidant outlet and may ignite the fuel. Ignition and/or combustion of the fuel and oxidant in the combustion chamber 220 may produce a flame 10.

The fuel nozzle assembly 210 may be attached or connected to a mounting plate 230, which may be secured to a base of the combustion system 200 and/or to a base 111 of the shell 110 (e.g., the mounting plate 230 may be bolted to the base of the combustion system 200 and/or to the base 111 of the shell 110). The combustion system 200 may include a blower 250 operably connected to the fuel nozzle assembly 210 (e.g., the blower 250 may be connected to the oxidant outlet), such that the blower 250 may force the oxidant into the combustion chamber 220, and the oxidant together with the fuel may facilitate combustion thereof. For example, an oxidant line 251 may place the blower into fluid communication with the oxidant outlet of the fuel nozzle assembly 210.

The fuel nozzle of the fuel nozzle assembly 210 may be connected to a fuel supply 260 (e.g., a fuel line 261 may provide fluid communication between the fuel nozzle of the fuel nozzle assembly 210 and the fuel supply 260). The fuel supply 260 may include any number of suitable fuels. For example, the fuel supply 260 may include natural gas, propane, #2 fuel oil, #6 fuel oil, combinations of the foregoing, etc. Furthermore, a fuel valve 270 may be operated to control the amount of fuel injected from the fuel nozzle into the combustion chamber 220 (e.g., the fuel valve 270 may be positioned between the fuel supply 260 and the fuel nozzle).

In some embodiments, a boiler controller 280 may control operation of the blower 250 and/or fuel valve 270. For example, the boiler controller 280 may control the flow of oxidant (e.g., air) forced into the combustion chamber 220 by controlling the operation of the blower 250. By controlling or operating the fuel valve 270, the boiler controller 280 may control the amount and/or velocity of the fuel injected into the combustion chamber 220.

Generally, combustion of the fuel produces flue gas. The temperature of the flue gas may be higher than ambient temperature outside of the fire-tube boiler 100. The flue gas may be channeled from the combustion system 200 into an exhaust plenum 120 and subsequently into fire tubes 130. In the illustrated embodiment, the flue gas flows in the fire tubes 130 from the exhaust plenum 120 toward the base 111 of the shell 110 (e.g., in the direction opposite to the direction of fuel flow in the combustion system 200). It should be appreciated, however, that the fire tubes 130 and the shell 110 of the fire-tube boiler 100 may have any suitable arrangement and the flue gas may flow inside such fire tubes in any suitable direction.

In some embodiments, the fire tubes 130 may be arranged such that the flue gas may flow in multiple directions relative to the shell 110. In the illustrated embodiment, the fire-tube boiler 100 includes secondary fire tubes 131. Flue gas from the fire tubes 130 may enter the secondary fire tubes 131 and may flow in the direction opposite to the flow of the flue gas in the fire tubes 130. Moreover, the flue gas from the fire tubes 131 may exit the fire-tube boiler 100 out of an exhaust 140. Generally, the flue gasses exiting the exhaust 140 of the fire-tube boiler 100 may include a relatively high level of $NO_x$.

In the illustrated embodiment, the shell 110 is configured to hold water. As mentioned above, the combustion system 200 is positioned inside the shell 110 of the fire-tube boiler 100. Moreover, the fire tubes 130, 131 also may be positioned inside the shell 110. Hence, for example, the water in the shell 110 may at least partially surround the exterior of the combustion chamber 220 of the combustion system 200 and/or exterior of the fire tubes 130, 131. During combustion, the combustion chamber 220 of the combustion system 200 is heated, and the heat is transferred from the combustion chamber 220 to the surrounding water. Furthermore, the flue gas may be generally hotter than the water in the shell 110. Accordingly, the heat from the flue gas may be transferred to the water in the shell 110 (through the fire tubes 130, 131). In any event, heat transferred from the exterior of the combustion chamber 220 and the heat transferred from the fire tubes 130, 131 to the water may increase the temperature thereof.

In the illustrated embodiment, the fire-tube boiler 100 includes at least one water inlet 150 and at least one water/steam outlet 160. Specifically, water may be circulated through the shell 110 such that added water is heated to a suitable temperature, and steam or hot water exits the shell 110 for further use (e.g., to generate power, such as by passing through a turbine, to heat spaces, etc.). The fire-tube boiler 100 also may include at least one inlet valve 155 and at least one outlet valve 165, which may correspondingly control the flow of water into and/or out of the shell 110. For example, the boiler controller 280 may control and/or operate the inlet and/or outlet valves 155, 165 to control the flow of water into and/or out of the shell 110, the temperature of the water in the shell 110, the amount of the water in the shell 110, combinations of the foregoing, etc.

The fire-tube boiler 100 in the illustrated example is generally horizontally oriented and has a generally horizontally oriented combustion system 200. It should be appreciated that the fire-tube boiler 100 and/or the combustion system 200 thereof may have any number of suitable orientations, which may vary from one example to the next (e.g., the fire-tube boiler 100 and/or the combustion system 200 may have generally vertical orientation). Moreover, the combustion system 200 (or a similar combustion system) may be used in or incorporated into any number of suitable devices and systems for heating one or more objects and/or substances (e.g., in furnaces, water heaters, etc.).

As noted above, the combustion system 200 of the fire-tube boiler 100 may be installed and/or retrofitted with a prefabricated integrated combustion assembly including a perforated flame holder in order to improve the operating efficiency thereof and/or to reduce the amount of pollutants, such as $NO_x$, produced thereby. More specifically, in some embodiments, the fuel nozzle assembly 210 may be disconnected from the combustion system 200 and fire-tube boiler 100 and the fuel nozzle assembly 210 may be subsequently removed therefrom. For example, the fuel nozzle assembly 210 may be disconnected from the oxidant line 251 and fuel line 261. Furthermore, as noted above, the fuel nozzle assembly 210 may be connected to or integrated with the mounting plate 230, which may be attached to the base 111 of the shell 110 and/or to the base 240 of the combustion chamber 220. In other embodiments, the fire-tube boiler 100 is not retrofitted, but rather a prefabricated integrated combustion assembly (e.g., prefabricated integrated combustion assembly 300 of FIG. 3) including a perforated flame holder may be installed into the fire-tube boiler 100 during final assembly.

Figure 2:
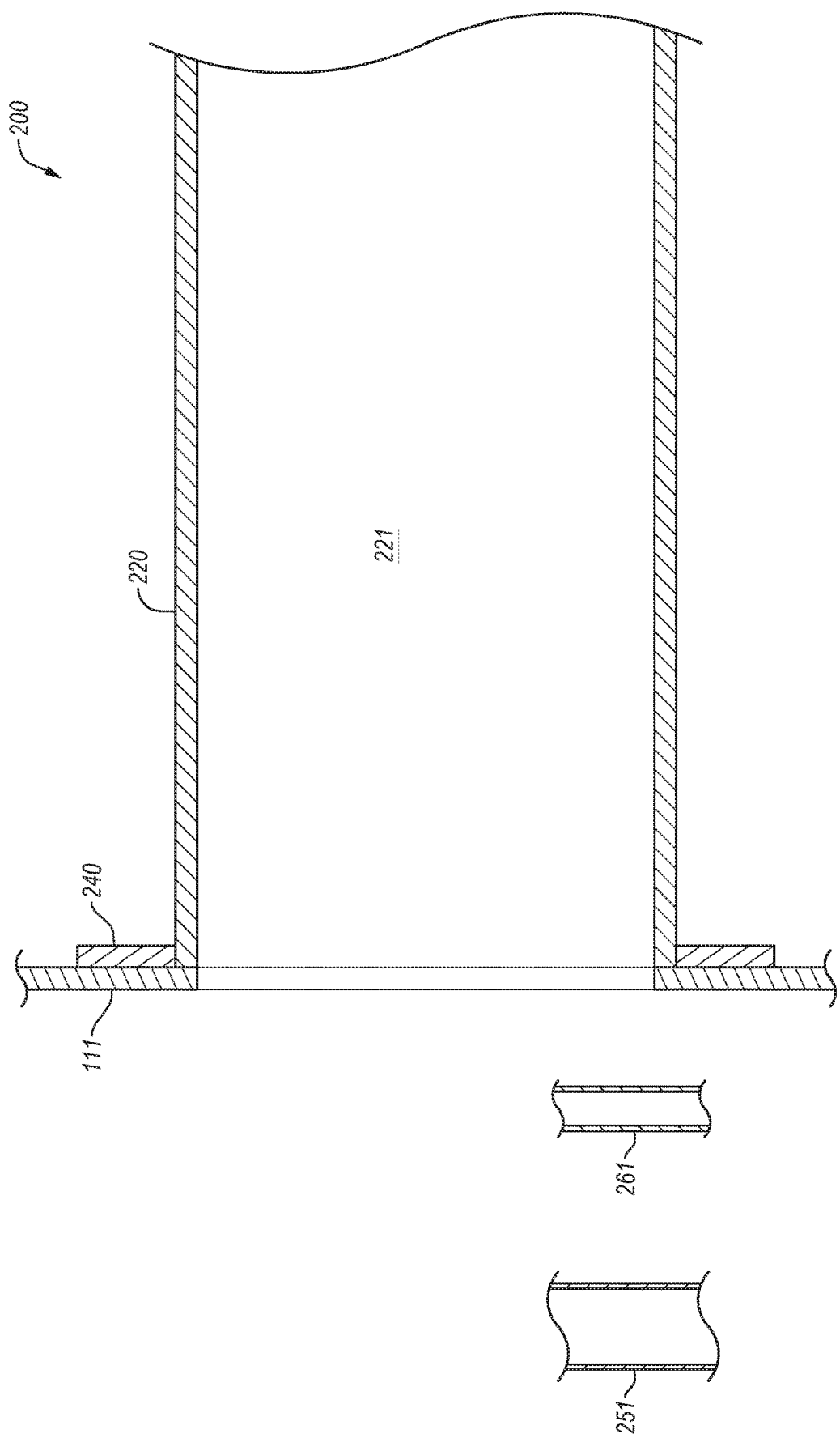
FIG. 2 is a cross-sectional view of a combustion chamber of the fire-tube boiler of FIG. 1, according to an embodiment.

FIG. 2 illustrates a cross-sectional view of the combustion system 200 after the fuel nozzle assembly 210 (FIG. 1) is removed therefrom and/or prior to installation of the prefabricated integrated combustion assembly (e.g., prefabricated integrated combustion assembly 300 of FIG. 3), according to an embodiment. More specifically, in some embodiments, after removal of the fuel nozzle assembly 210 and/or prior to installation of the prefabricated integrated combustion assembly, the base 240 of the combustion chamber 220 may be exposed for attaching the prefabricated integrated combustion assembly according to a number of different embodiments disclosed herein. Likewise, the oxidant line 251 and fuel line 261 may be exposed for connecting to a modified fuel nozzle assembly (of the integrated combustion assembly), as described below in more detail. In some embodiments, the base 240 may be backed by and/or attached to the base 111 of the shell of the fire-tube boiler. Hence, the integrated combustion assembly may be mounted to the base 111 and/or to the base 240 of the combustion chamber 220.

One or more portions or elements of the integrated combustion assembly may be positioned in and/or extend into an internal volume 221 of the combustion chamber 220. As such, for example, the internal volume 221 of the combustion chamber 220 may have sufficient size to accommodate such portions of the integrated combustion assembly and, vice versa, the integrated combustion assembly may be sufficiently sized and configured to fit into the internal volume 221 of the combustion chamber 220. Accordingly, the combustion system may be retrofitted without removal and/or replacement of the combustion chamber 220 (e.g., the combustion chamber 220 may remain in the shell of the fire-tube boiler). In any event, the integrated combustion assembly may be positioned in the internal volume 221 of the combustion chamber 220 and/or may be mounted or attached to the base 240 of the combustion chamber 220 and/or to the base 111 of the shell 110 of the fire-tube boiler 100. Again, the fire-tube boiler 100 is only an example of a device or system that may include the combustion system 200 or a similar combustion system, which may be retrofitted with the integrated combustion assembly according to one or more embodiments described herein.

Figure 3:
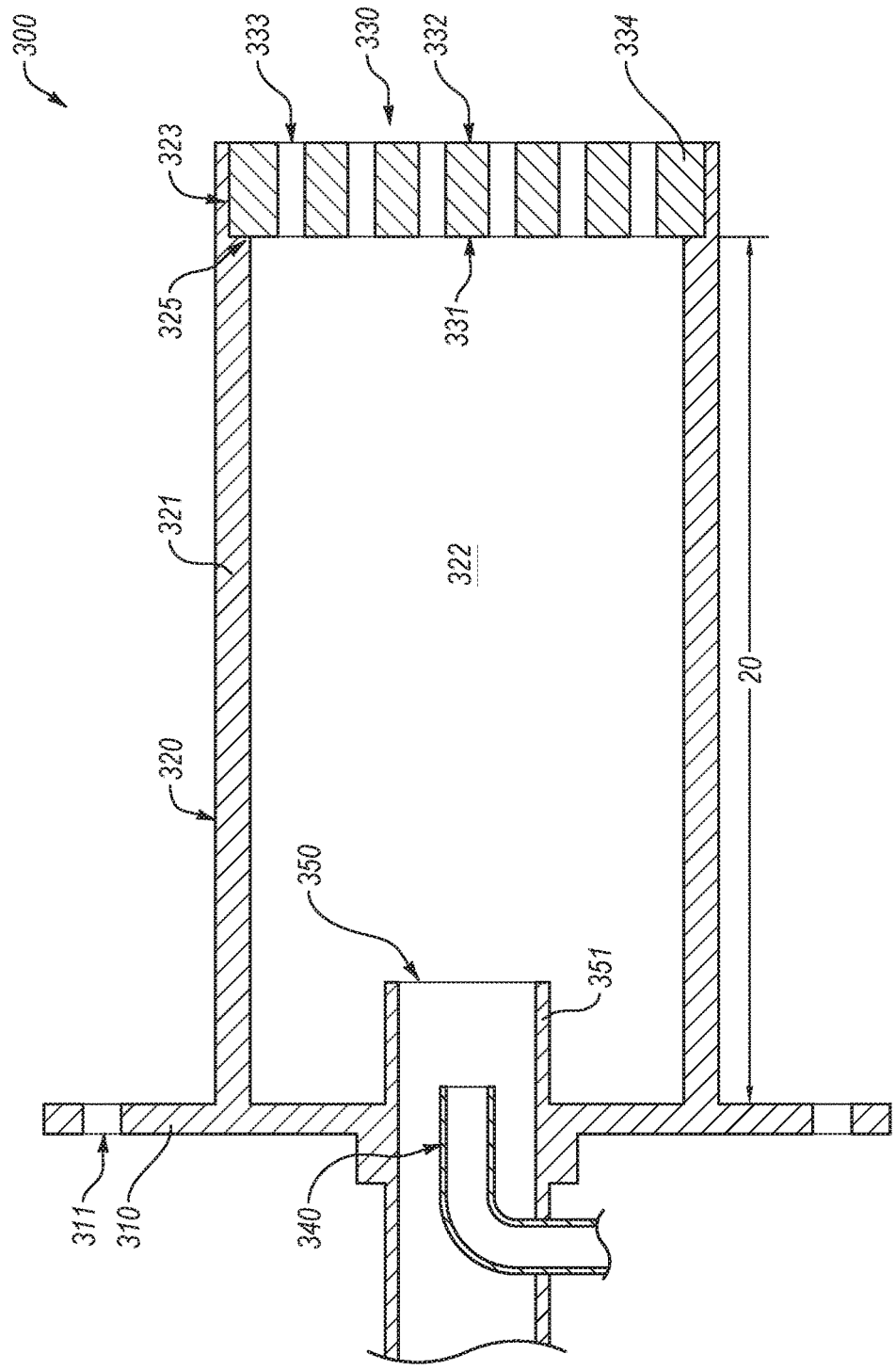
FIG. 3 is a cross-sectional view of a prefabricated integrated combustion assembly, according to an embodiment.

FIG. 3 illustrates a prefabricated integrated combustion assembly 300, according to an embodiment. In at least one embodiment, the integrated combustion assembly 300 includes a mounting plate 310 that may be configured to attach and/or mount to a combustion system. For example, the mounting plate 310 may be attached or mounted to the base of the combustion chamber. Additionally or alternatively, as mentioned above, the mounting plate 310 may be attached or mounted to the base of the fire-tube boiler (e.g., to the base of the shell).

In some embodiments, the mounting plate 310 may include one or more bolt holes 311. For example, one or more fasteners may be inserted through the corresponding bolt holes 311 and may connect the mounting plate 310 (and the integrated combustion assembly 300) to the base of the combustion chamber and/or to the base of the shell of the fire-tube boiler. It should be appreciated, however, that the mounting plate 310 and/or integrated combustion assembly 300 may be secured to the base of the combustion chamber and/or the base of the fire-tube boiler (e.g., to the base of the shell of the fire-tube boiler), with any number of suitable mechanisms, as described below in more detail.

In some embodiments, the integrated combustion assembly 300 may include a support 320 that may extend outward from the mounting plate 310. Generally, the support 320 may support a perforated flame holder 330 at a predetermined distance 20 from a mounting face of the mounting plate 310. Additionally or alternatively, the flame holder 330 may be secured to the support 320 at a predetermined orientation relative to the mounting face of the mounting plate 310.

For example, the support 320 may be generally tubular and may be defined by a continuous wall 321 (e.g., the support 320 may have an approximately cylindrical, tubular shape). Additionally or alternatively, the support 320 may have one or more openings therethrough and/or may have an otherwise non-continuous configuration. Moreover, in some embodiments, the support 320 may include multiple circumferentially-spaced supports extending outward from the mounting plate 310. Such supports 320 may also be sized and configured to support the flame holder 330 at the distance 20 from the mounting face of the mounting plate 310.

In one or more embodiments, the mounting plate 310 may be integrated with the support 320. For example, the mounting plate 310 and support 320 may be cast as a solid or integral body and/or may be machined thereafter to final dimensions. For instance, the mounting plate 310 and the support 320 may be cast from aluminum, zinc, iron, high-temperature refractory metal materials, or any number of suitable materials. Moreover, in some embodiments, the mounting plate 310 and the support 320 may be 3-D printed, fabricated using powder metallurgy techniques, or any other suitable manufacturing techniques to fabricate a mounting plate 310 that is substantially monolithic or integrated with the support 320.

The integrated combustion assembly 300 also may include a fuel nozzle 340, which may be configured to inject fuel into a combustion volume 322 that may be at least partially defined by the wall 321 of the support 320. In particular, as described below in more detail, the fuel may be ignited and/or combusted in the combustion volume 322. To facilitate ignition and/or combustion of the fuel, the integrated combustion assembly 300 may include an oxidant outlet 350 that, in some embodiments, may be defined by a tubular member 351. In particular, the tubular member 351 may lack one or more vortex generating structures (e.g., swirl vanes) and is configured to, at least selectively, cause heat not to be recycled near the fuel nozzle 340, thereby allowing the fuel and oxidant to reach the perforated flame holder 330 prior to ignition of the combustion reaction.

For example, oxidant may flow or may be forced out of the oxidant outlet 350 and into the combustion volume 322. Moreover, the oxidant may mix with the fuel to facilitate the combustion of the fuel and oxidant mixture. In an embodiment, the fuel nozzle 340 may be at least partially positioned within the flow of the oxidant (e.g., upstream from the oxidant outlet 350). As such, for example, as the fuel flows from the fuel nozzle 340 into the combustion volume 322, the fuel may mix with the oxidant flowing and/or being forced out of the oxidant outlet 350. Subsequently, the mixed fuel and oxidant (e.g., air) may be ignited and/or combusted downstream from the fuel nozzle 340 and oxidant outlet 350, as described below in more detail.

In at least one embodiment, the fuel nozzle 340 and/or the oxidant outlet 350 may be integrally formed with the mounting plate 310 and/or support 320. For example, the oxidant outlet 350 may be integrally formed with the mounting plate 310 (e.g., with one or more fabrication methods described above in connection with the mounting plate 310 and the support 320). As mentioned above, the fuel nozzle 340 may be positioned inside the flow of the oxidant, and at least a portion of the fuel nozzle 340 may be positioned upstream from the oxidant outlet 350, such that before flowing out the oxidant outlet 350, the oxidant (e.g., air) may flow around the fuel nozzle 340 and mix with the fuel exiting the fuel nozzle 340.

In an embodiment, the fuel nozzle 340 may be connected to and/or integrally formed with the tubular member 351 that defines the oxidant outlet 350 and with the mounting plate 310. In any event, the tip of the fuel nozzle 340 may be positioned at a predetermined location or distance and/or may have a predetermined orientation relative to the mounting face of the mounting plate 310. As described above, the flame holder 330 may be positioned at the predetermined distance 20 from the mounting face of the mounting plate 310. Accordingly, the flame holder 330 may be positioned at the predetermined distance from the tip of the fuel nozzle 340.

The flame holder 330 may include an upstream side 331 and a downstream side 332. As the fuel and oxidant mixture approaches and/or contacts the flame holder 330 (e.g., the upstream side 331 of the flame holder 330), the fuel and oxidant mixture may be ignited and/or combusted. Furthermore, the flame holder 330 includes a plurality of apertures 333 that may be formed in and/or defined by a body 334 of the flame holder 330. Each or some of the apertures 333 extend from the upstream side 331 to the downstream side 332 completely through the thickness of the body 334. In any event, as the fuel and oxidant mixture ignites and/or combusts at the flame holder 330, at least some of the flame formed thereby may enter the one or more of the apertures 333 in the body 334 of the flame holder 330.

Generally, the flame holder 330 may be formed from or include any number of suitable materials, which may vary from one embodiment to the next. For example, the flame holder 330 may include refractory metal materials, ceramics, high-temperature alloys (e.g., nickel superalloys), etc. Moreover, the apertures 333 of the flame holder 330 may have any suitable shape and/or size (e.g., the apertures 333 may be approximately cylindrical, prismoid, etc.). Similarly, the apertures 333 may be positioned and/or arranged on the body 334 of the flame holder 330 in any number of suitable configurations (e.g., the apertures 333 may have a generally circular arrangement on the body 334 of the flame holder 330). Examples of suitable configurations for the flame holder 330 are disclosed in PCT International Application No. PCT/US2014/016628 filed on 14 Feb. 2014, the disclosure of which is incorporated herein, in its entirety, by this reference.

The flame holder 330 also may have any suitable thickness, shape, size, or combinations thereof. In at least one embodiment, the flame holder 330 may have an approximately cylindrical shape (e.g., the flame holder 330 may have a circular cross-section). For example, the support 320 may surround at least a portion of a lateral periphery of the flame holder 330.

It should be appreciated that the flame holder 330 may be secured or attached to the support 320 with any number of suitable mechanisms and in any number of suitable configurations. In an embodiment, the support 320 may include a shoulder 325, which may position and/or orient the flame holder 330 relative to the mounting face of the mounting plate 310 (e.g., the upstream side 331 may abut and/or may sit on the shoulder 325 of the support 320). Moreover, in an embodiment, the flame holder 330 may be press-fitted into the support 320. For example, the support 320 may include an opening or a pocket 323, which may be sized and configured to accept the flame holder 330 with an interference fit, slip fit, or merely having the flame holder 330 at least partially positioned therein.

In some embodiments, the support 320 may be initially heated (e.g., to a temperature of at least about the operating temperature of the integrated combustion assembly 300 or above such temperature), and the flame holder 330 may be subsequently press-fitted into the pocket 323 of the support 320. Accordingly, as the temperature of the support 320 increases and the support 320 expands, the flame holder 330, which may have a lower coefficient of thermal expansion than the support 320, may remain press-fitted in the pocket 323 of the support 320. Additionally or alternatively, the flame holder 330 may be brazed, welded, or otherwise secured to and/or within the pocket 323 of the support 320.

Because the tip of the fuel nozzle 340 is positioned at the predetermined distance relative to the flame holder 330, the fuel and oxidant mixture exiting the fuel nozzle 340 may be suitably positioned relative to the flame holder 330. For example, the flame holder 330 may be positioned at or about at a centroid of or a terminal end of the flame or flame radiation that may be produced from the ignition of the fuel and oxidant mixture in the absence of the flame holder 330. In other words, the flame produced in the absence of the flame holder 330 may extend from a first downstream position to a second downstream position, and the flame holder 330 (when secured to the support 320) may be positioned approximately midway between the first and second positions or at or near the terminal tip of the flame. Moreover, mounting the integrated combustion assembly 300 in the combustion system (as described above) may position the fuel nozzle 340 and the flame holder 330 at predetermined relative positions and orientations relative to each other within the combustion chamber of the combustion system.

While the combustion system shown in FIG. 1 is configured as a fire-tube boiler 100 that is not particularly sensitive to radiant heat transfer, other types of combustions systems are relatively more sensitive to radiation heat transfer. For example, a steam tube boiler, which is typically used for very large systems such as electric power generation, includes a radiation heat transfer section for producing superheat in the steam.

Locating the perforated flame holder 330 at or near the centroid of the flame may be beneficial in a steam tube boiler or other combustion systems that are relatively more sensitive to radiation heat transfer than a fire-tube boiler.

During the installation process, an installer/system integrator may insert the integrated combustion assembly 300 into the combustion system. In some embodiments, because the tip of the fuel nozzle 340 is positioned at the predetermined distance from the flame holder 330 and at a predetermined orientation relative thereto, the integrated combustion assembly 300 may be incorporated into the combustion system without further adjustments to the relative position and/or orientation of the flame holder 330 and fuel nozzle 340. Accordingly, the integrated combustion assembly 300 may increase a speed of retrofitting and/or final assembly of the combustion system, reduce errors (which may be potentially dangerous during the operation of the combustion system), and improve performance of the combustion system.

In any event, the flame produced during combustion of the fuel and oxidant mixture at or near the flame holder 330, may be at least partially anchored to the flame holder 330. Accordingly, heat from the flame may be transferred to the flame holder 330, thereby lowering combustion temperature and/or the flame temperature. Moreover, lowering combustion and/or flame temperature may reduce $NO_x$ produced during combustion of the fuel and oxidant mixture. As such, under some operating conditions, the retrofitted combustion system may exhibit a lower $NO_x$ production and/or higher operating efficiency.

Figure 4:
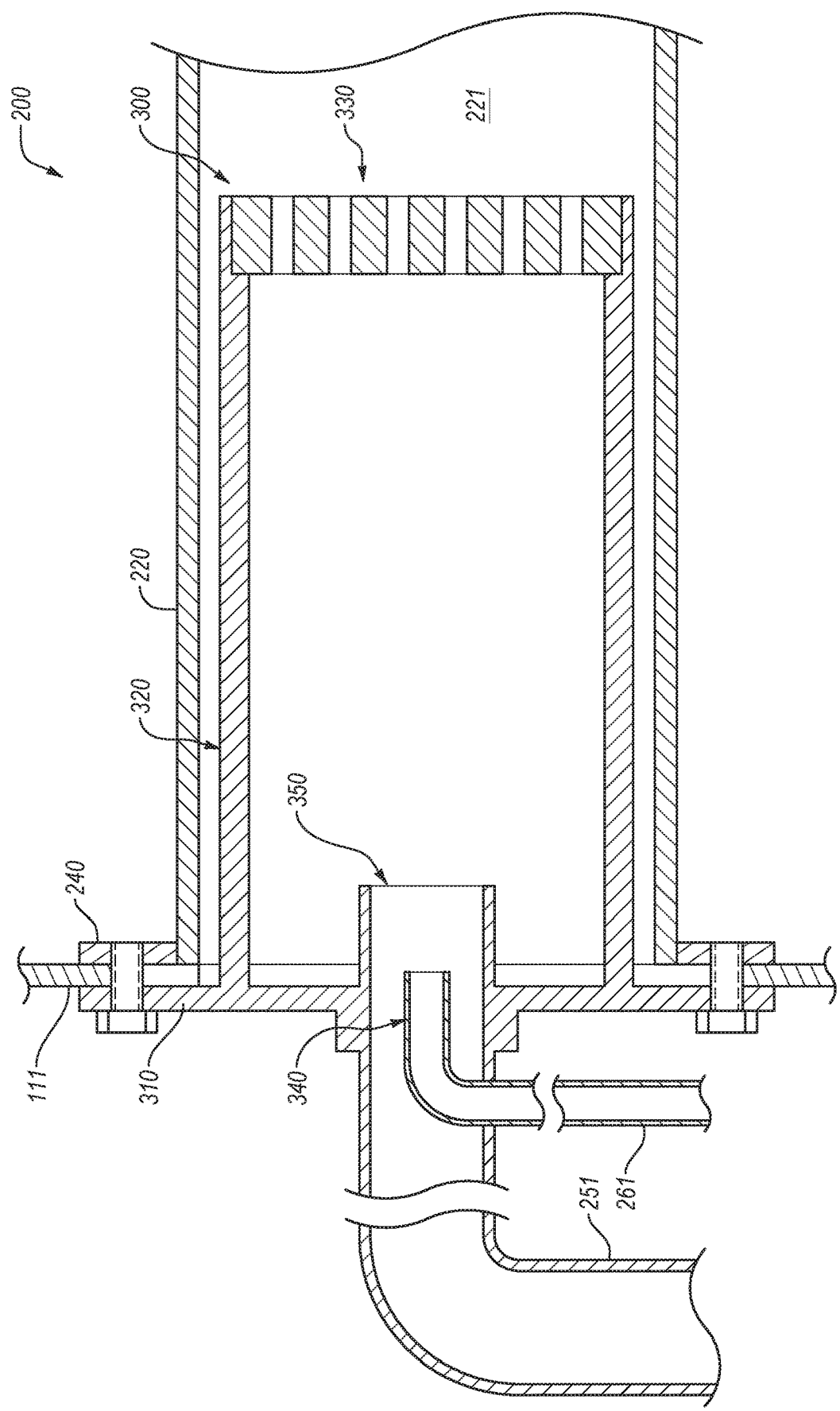
FIG. 4 is a cross-sectional view of the combustion chamber of FIG. 2 with the integrated combustion assembly of FIG. 3 installed therein, according to an embodiment.

FIG. 4 illustrates the integrated combustion assembly 300 retrofitted into the combustion system 200, according to an embodiment. In particular, the fuel nozzle 340 may be connected to the fuel line 261, which may supply fuel to the fuel nozzle 340, and the oxidant outlet 350 may be connected to the oxidant line 251, which may supply oxidant, such as air, to the oxidant outlet 350. Moreover, the mounting plate 310 may be attached or mounted to the base 111 of the shell 110 of fire-tube boiler 100, such that the support 320 together with the flame holder 330 are positioned inside the internal volume 221 of the combustion chamber 220.

In the illustrated embodiment, the mounting plate 310 is secured to the base 111 with mounting screws. As noted above, however, the mounting plate 310 may be secured to the base 111 and/or to the base 240 in any suitable manner. For example, one or more tabs or clamps may clamp down and/or secure the mounting plate 310 to the base 111 and/or base 240. Additionally or alternatively, the mounting plate 310 may be welded, brazed, or otherwise permanently or semi-permanently attached to the base 111 and/or to the base 240. Examples of suitable attachments further include one or more channels that may secure the mounting plate 310 to the one base 111 and/or to the base 240, backing plates that may clamp down and secure the mounting plate 310 to the base 111 and/or to the base 240, combinations of the foregoing, or other suitable attachment mechanisms.

Figure 5:
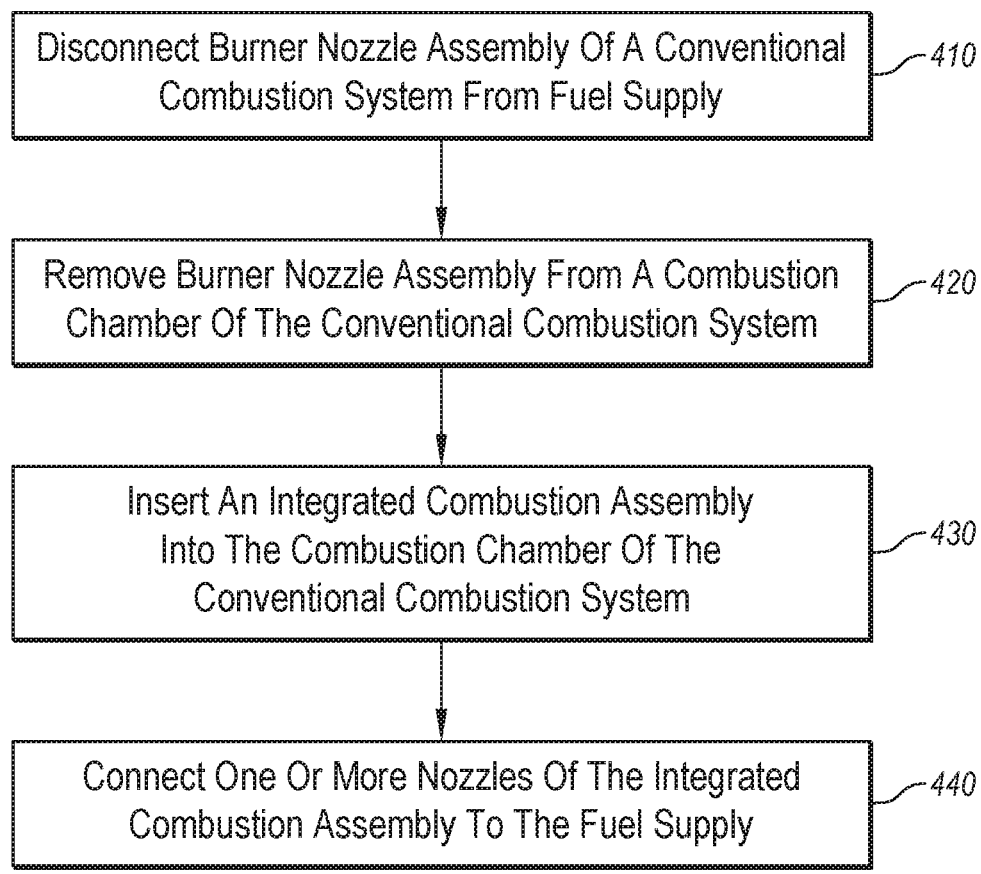
FIG. 5 is a flowchart of a method for installing a prefabricated integrated combustion assembly into a combustion system, according to an embodiment.

Generally, the combustion system may be retrofitted and/or finally assembled with the integrated combustion assembly 300 in any suitable manner. FIG. 5 illustrates a flow chart of a method for retrofitting the combustion system 200 (FIG. 2) with an integrated combustion assembly, according to an embodiment (e.g., any of the integrated assemblies described herein may be integrated into the combustion system 200 or other type of conventional combustion system). In particular, in some embodiments, retrofitting a conventional burner with an integrated combustion assembly may include an act 410 of disconnecting an existing burner nozzle assembly (e.g., fuel nozzle assembly) of the conventional combustion system from the fuel supply.

In at least one embodiment, retrofitting the conventional combustion system also may include an act 420 of removing the burner nozzle assembly from a combustion chamber of the conventional combustion system. As mentioned above, after the burner nozzle assembly (e.g., fuel nozzle assembly) is removed from the conventional combustion system, the integrated combustion assembly may be incorporated into the combustion chamber. For example, retrofitting may include an act 430 of inserting an integrated combustion assembly into the combustion chamber of the conventional combustion system. Retrofitting also may include an act 440 of connecting one or more nozzles of the integrated combustion assembly to the fuel supply. It should be appreciated that, while the acts for retrofitting a conventional combustion system are described in a particular order, the acts may be performed and any suitable order. Furthermore, as previously noted, in some embodiments, the combustion system is not conventional and is not retrofitted. Instead, in such embodiments, the integrated combustion assembly is inserted into the combustion chamber in the process of final assembly of a new combustion system.

Figure 6:
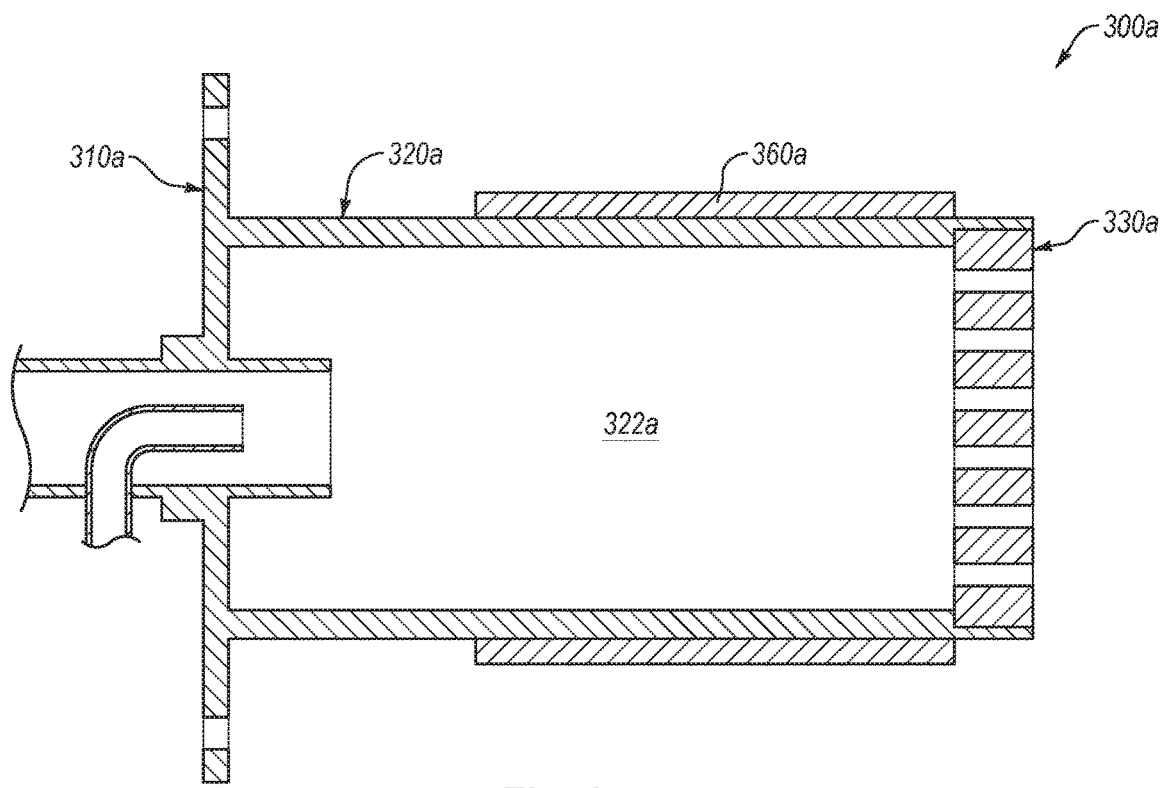
FIGS. 6-9 are cross-sectional views of different prefabricated integrated combustion assemblies according to various embodiments.

As previously discussed, the integrated combustion assembly may vary from one embodiment to the next. FIG. 6 illustrates an integrated combustion assembly 300a, according to an embodiment. Except as otherwise described herein, the integrated combustion assembly 300a and its elements and components may be similar to or the same as the integrated combustion assembly 300 (FIG. 3) and its respective elements and components. For example, the integrated combustion assembly 300a may include a mounting plate 310a and a support 320a extending therefrom and securing a flame holder 330a, which may be the same as the mounting plate 310, support 320, and flame holder 330 (FIG. 3). In an embodiment, the integrated combustion assembly 300a may include insulation 360a, which may at least partially wrap around the support 320a.

In particular, the insulation 360a may prevent or limit radial heat transfer from the perforated flame holder 330, such that the heat transferred from the flame to the flame holder 330a is concentrated at the flame holder 330a to maintain a fuel ignition temperature within the flame holder 330a. In other words, for example, the insulation 360a may limit the radiant heat transfer from the support 320a to the combustion chamber. In some embodiments, the majority of heat transfer from the flame in a combustion volume 322a of the support 320a may be to the flame holder 330a. As such, in at least one embodiment, a majority of the heat transfer from the flame to the combustion chamber, and subsequently to the water heated thereby, may be radiant heat transfer from the flame holder 330a to the walls of the combustion chamber.

Figure 7:
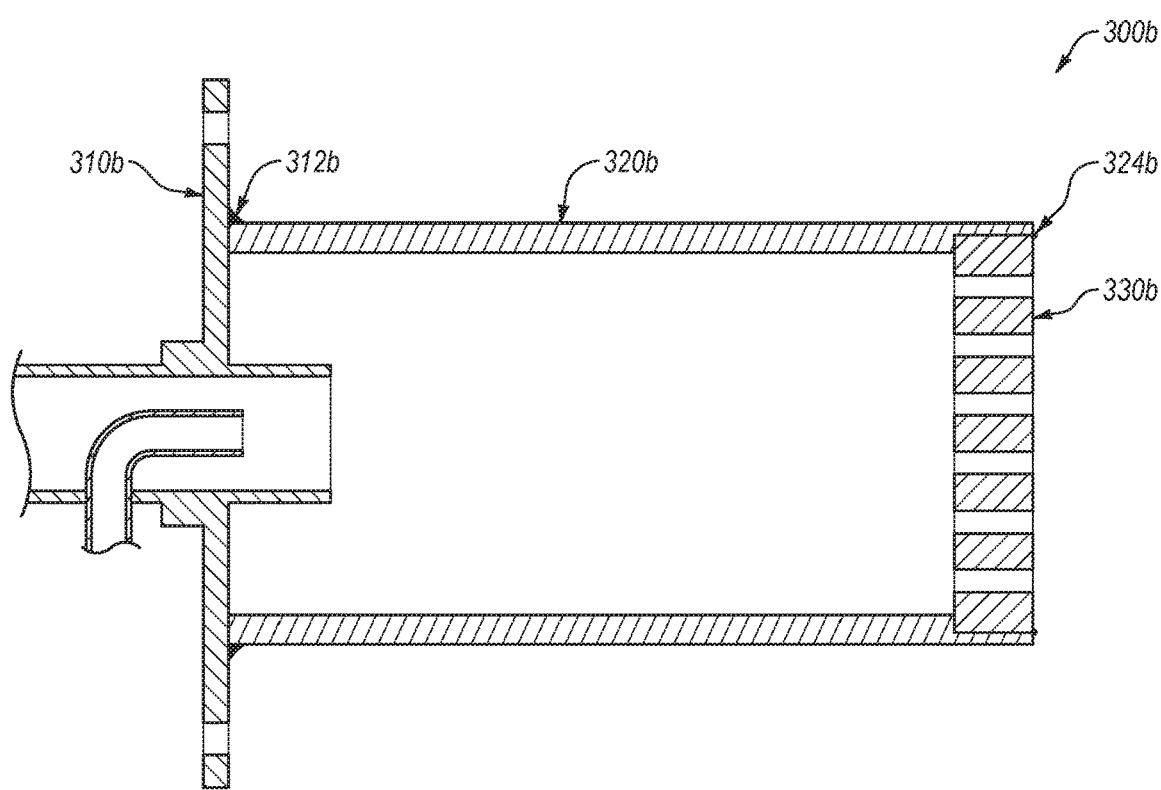

As described above, in some embodiments, the mounting plate, one or more supports, the fuel nozzle, the oxidant outlet, or combinations thereof may be integrally formed. Alternatively, two or more of these elements may be connected or fastened together. FIG. 7 illustrates an integrated combustion assembly 300b, according to an embodiment. Except as otherwise described herein, the integrated combustion assembly 300b and its elements and components may be similar to or the same as any of the integrated combustion assemblies 300, 300a (FIGS. 3 and 6) and their respective elements and components. For example, the integrated combustion assembly 300b may include mounting plate 310b and support 320b connected together, which may be similar to the mounting plate 310a and support 320a (FIG. 6). In the illustrated embodiment, the mounting plate 310b and the support 320b are welded together. For example, a weld 312b (e.g., a fillet weld) may connect the support 320b to the mounting plate 310b on the mounting side of the mounting plate 310b.

In some embodiments, the mounting plate 310b and the support 320b may be formed from or include the same material (e.g., the mounting plate 310b and support 320b may comprise stainless steel). Alternatively or additionally, the mounting plate 310b and support 320b may include a different combination of weldable materials (e.g., the mounting plate 310b may include carbon steel and the support 320b may include stainless steel). It should be appreciated that, as mentioned above, the integrated combustion assembly 300b may include multiple supports 320b. As such, one or some of the supports 320b may be formed from or include the same material as the mounting plate 310b, and one or some of the supports 320b may include or comprise a different material than the mounting plate 310b. Moreover, in some embodiments, the support(s) 320b may be fastened, brazed, or otherwise secured to the mounting plate 310b.

In one or more embodiments, a flame holder 330b of the integrated combustion assembly 300b may be brazed to the support 320b. In particular, for example, a braze joint 324b may secure the flame holder 330b to the support 320b. Generally, the weld material for the weld 312b and the braze material for the braze joint 324b may be selected from any suitable materials, which may vary from one embodiment to the next. It should be appreciated that brazing involves using a material different from one or more of the elements connected thereby and/or which may be melted at a temperature lower than the melting temperatures of the elements connected thereby. In any event, the weld material for the weld 312b and the braze material for the braze joint 324b may be selected from any suitable material that may respectively secure the mounting plate 310b to the support 320b and the flame holder 330b to the support 320b, such that the mounting plate 310b and support 320b, as well as the flame holder 330b and support 320b remain secured together during the operation of the integrated combustion assembly 300b as well as while retrofitting of and/or final assembly of the combustion system.

Figure 8:
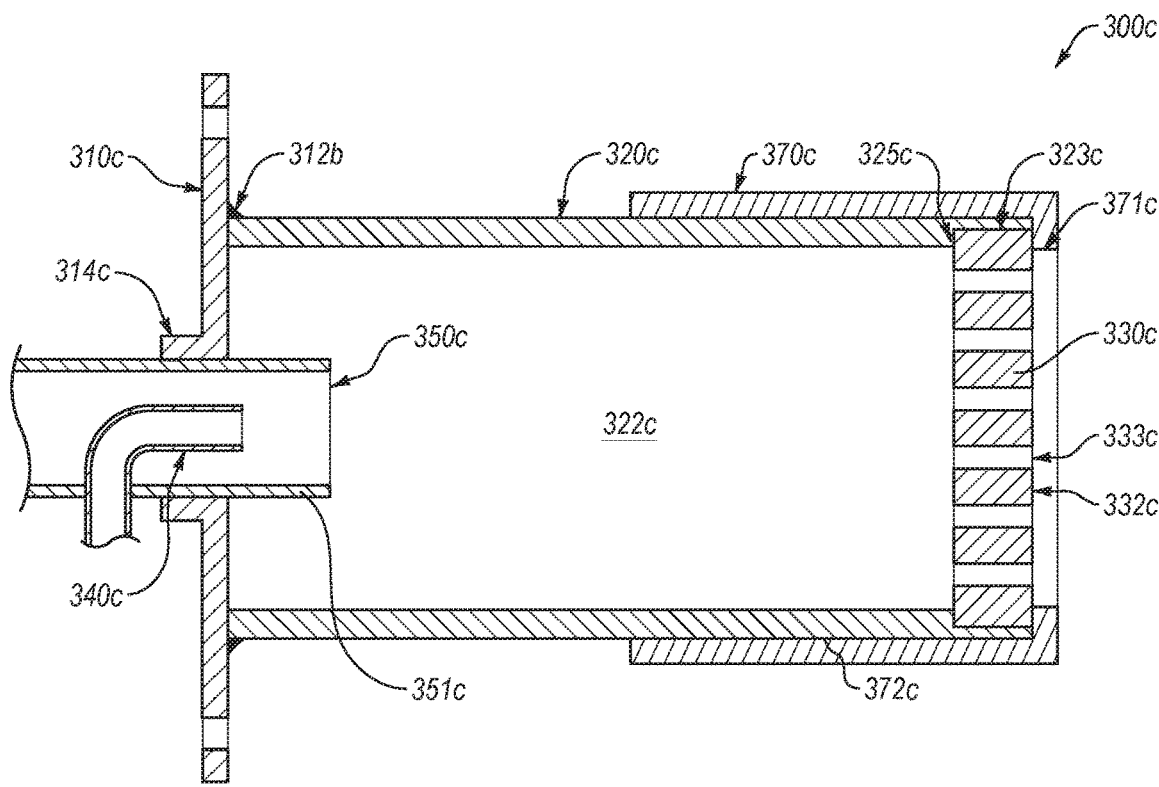

As described above, the flame holder may be connected or attached to one or more supports with any number of suitable mechanisms. FIG. 8 illustrates an integrated combustion assembly 300c, according to an embodiment. In particular, in the illustrated example, the integrated combustion assembly 300c includes a cap 370c that secures a flame holder 330c to a support 320c of the integrated combustion assembly 300c. Except as otherwise described herein, the integrated combustion assembly 300c and its elements and components may be similar to or the same as any of the integrated combustion assemblies 300, 300a, 300b (FIGS. 3, 6, and 7) and their respective elements and components. For example, the flame holder 330c may be positioned in a pocket 323c of the support 320c, and the cap 370c may press the flame holder 330c against a shoulder 325c of the support 320c, thereby securing together the support 320c and the flame holder 330c.

In an embodiment, the cap 370c may be secured to the support 320c. For example, the cap 370c may be press-fitted over the support 320c. Additionally or alternatively, the cap 370c may be welded or brazed to the support 320c. In some embodiments, the cap 370c may include multiple portions that may be assembled together about the support 320c and may be fastened together in a manner that secures the cap 370c to the support 320c. In any case, the cap 370c may be secured to the support 320c with any number of suitable mechanisms, which may vary from one embodiment to the next.

In some embodiments, the cap 370c may include an opening 371c that may be configured such that apertures 333c of the flame holder 330c are generally unobstructed by the cap 370c. Moreover, the cap 370c may include peripheral walls 372c that may wrap around at least a portion of the support 320c. For example, the peripheral walls 372c may extend along the support 320c (e.g., an inward facing surface of the cap 370c may be in contact with a peripheral or outward facing surface of the support 320c).

Generally, the cap 370c may extend along any suitable portion of the support 320c. For example, the cap 370c may extend along the support 320c approximately halfway between a downstream side 332c of the flame holder 330c and a mounting surface of the mounting plate 310c. In alternative or additional embodiments, the cap 370c may extend farther toward or to the mounting surface of the mounting plate 310c.

As described above, the support 320c may be welded to the mounting plate 310c via a weld 312c. In additional or alternative embodiments, the cap 370c may extend to the mounting surface of the mounting plate 310c and may be welded thereto. More specifically, for example, the support 320c and the cap 370c may be welded to the mounting plate 310c and/or may be welded together. In at least one embodiment, the cap 370c may be welded to the mounting plate 310c, while the support 320c may remain otherwise detached from the mounting plate 310c. As such, the cap 370c may secure the support 320c and the flame holder 330c together and secure the support 320c to the mounting plate 310c.

As mentioned above, a portion of the peripheral surface of the support 320c may be insulated, such as to reduce infrared or radiant heat transmission from the support 320c to the wall of the combustion chamber. In some embodiments, at least a portion of the cap 370c may include insulating material that may provide sufficient insulation to reduce or prevent radiant heat transfer from the support 320c to wall of the combustion chamber. As noted above, reducing heat transfer from the support 320c to the wall of the combustion chamber may focus the heat transfer from the flame to the flame holder 330c, and flame holder 330c may radiate heat toward or to the wall(s) of the combustion chamber.

In some embodiments, an oxidant outlet 350c of the integrated combustion assembly 300c may extend into a combustion volume 322c (e.g., the oxidant outlet 350c may be defined by a tubular member 351c that may have a substantially smooth interior or may have one or more fins or baffles to alter the flow of oxidant and/or fuel therethrough). In some embodiments, the oxidant outlet 350c and/or the fuel nozzle 340c may be connected to the mounting plate 310c. For example, the oxidant outlet 350c and/or fuel nozzle 340c may be press-fitted into an opening in the mounting plate 310c.

Alternatively, the oxidant outlet 350c and/or fuel nozzle 340c may be positioned inside an opening in the mounting plate 310c and may be welded, brazed, fastened, or otherwise attached to the mounting plate 310c. As described above, the fuel nozzle 340c may be positioned inside the oxidant outlet 350c and may be connected thereto. As such, in some instances, connecting or attaching the oxidant outlet 350c to the mounting plate 310c may correspondingly connect the fuel nozzle 340 to the mounting plate 310c. In an embodiment, the oxidant outlet 350c may be integrally formed with the mounting plate 310c.

In an embodiment, the mounting plate 310c may include a standoff 314c that may extend out and away from the combustion volume 322c (e.g., the standoff 314c may extend outward from a back surface of the mounting plate 310c). For example, the oxidant outlet 350c may be press-fitted in the standoff 314c, which may provide sufficient surface area for press-fitting the oxidant outlet 350c in a manner that sufficiently secures the oxidant outlet 350c to the mounting plate 310c. Additionally or alternatively, the oxidant outlet 350c may be welded to the standoff 314c (e.g., a weld may be positioned between or at the outer surface of the tubular member 351c and an edge of the standoff 314c).

In some embodiments, the integrated combustion assembly may include an integrated ignition mechanism. Furthermore, the integrated combustion assembly may be preassembled with a combustion controller, which may at least partially control operation of the integrated combustion assembly. For example, the combustion controller may cooperate with a controller (e.g., boiler controller 280 of FIG. 1) of the fire-tube boiler to control combustion in the integrated combustion assembly.

Figure 9:
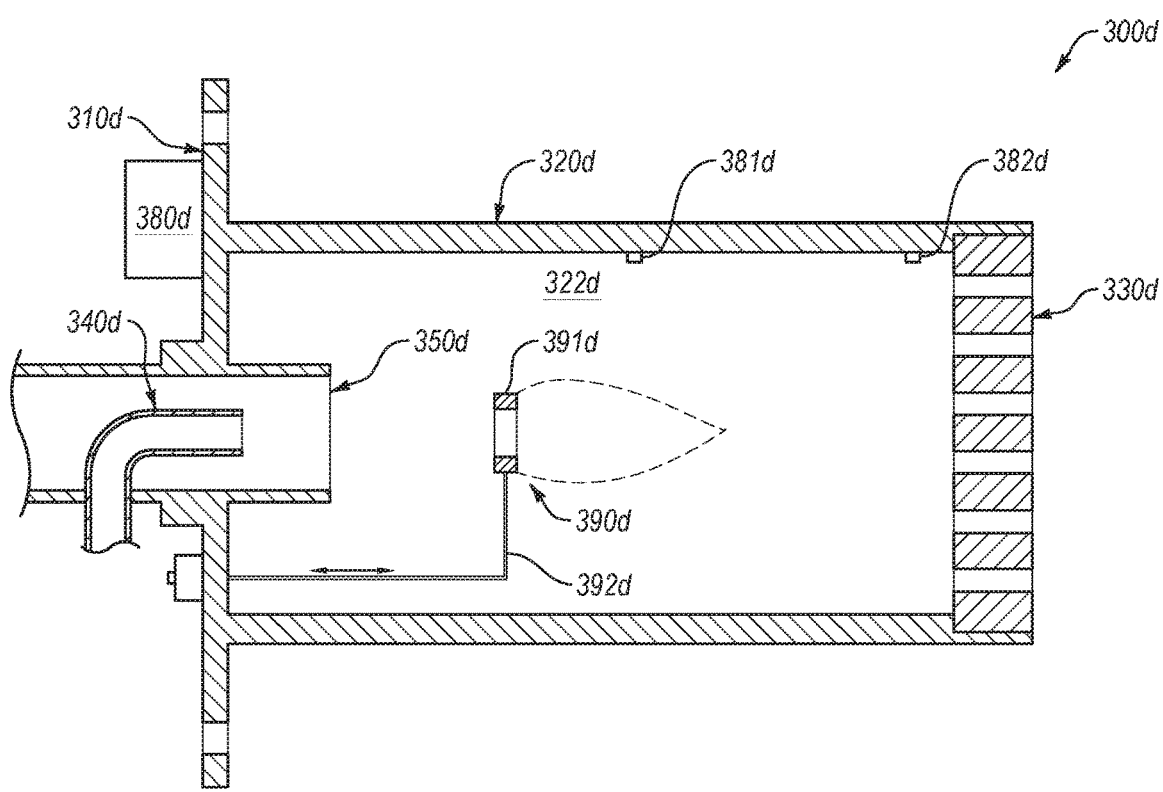

FIG. 9 illustrates an integrated combustion assembly 300d that includes a combustion controller 380d and ignition assembly 390d, according to an embodiment. For example, the combustion controller 380d may be mounted to a mounting plate 310d or other component of the integrated combustion assembly 300d, such as a fuel nozzle assembly. Except as otherwise described herein, the integrated combustion assembly 300d and its elements and components may be similar to or the same as any of the integrated combustion assemblies 300, 300a, 300b, 300c (FIGS. 3 and 6-8) and their respective elements and components.

In an embodiment, in operation, the combustion controller 380d may receive signals or input from one or more sensors, such as one or more ultraviolet ("UV") sensors 381d and/or one or more infrared sensors 382d. For example, the UV sensors 381d may detect a presence of a combustion byproduct, such as $NO_x$ and the infrared sensors 382d may measure a temperature of the combustion volume 322d. The UV and/or infrared sensors 381d, 382d may transmit one or more signals responsive to detecting the presence of the combustion byproduct and/or the temperature of the combustion volume 322d, respectively. In some embodiments, the combustion controller 380d may adjust or modify the flow of fuel and/or oxidant out of the respective fuel nozzle 340d and oxidant outlet 350d to adjust the combustion of the fuel and oxidant mixture and/or the flame produced thereby in response to receiving the one or more signals transmitted by the UV and/or infrared sensors 381d, 382d. For example, the combustion controller 380d may, independently or in cooperation with the boiler controller, control and/or operate a fuel valve (e.g., fuel valve 270 of FIG. 1) and/or a blower (e.g., blower 250 of FIG. 1) to control the fuel and/or oxidant flow out of the fuel nozzle 340d and oxidant outlet 350d. Additionally or alternatively, the combustion controller 380d may control operation of the ignition assembly 390d, as described below in more detail.

In some embodiments, at least partially based on the signals from the UV sensor(s) 381d, the combustion controller 380d may determine and/or estimate the amount of $NO_x$ produced during combustion and may adjust the flame accordingly. For example, the combustion controller 380d may reduce the amount of fuel and/or increase amount of oxidant flowing into the combustion volume 322d, to produce a leaner burn that may generate less $NO_x$. In additional or alternative embodiments, the combustion controller 380d may receive signals from the infrared sensor(s) 382d that may be related to the temperature of a flame holder 330d of the integrated combustion assembly 300d. For example, the combustion controller 380d may adjust the combustion of the fuel and oxidant mixture and/or the flame produced thereby at least partially based on the temperature of the flame holder 330d (e.g., the combustion controller 380d may reduce the amount of fuel flowing into the combustion volume 322d to reduce the temperature of the flame holder 330d or increase the amount of fuel to increase the temperature of the flame holder 330d, such as to achieve a suitable and/or predetermined temperature).

During or after installation of the integrated combustion assembly, a fuel line (e.g., fuel line 261 of FIGS. 1-2) is operably coupled to the fuel nozzle 340d, an oxidant source or a blower is operably coupled to the oxidant outlet 350d, and the combustion controller 380d is operably coupled to the boiler controller.

As noted above, the combustion controller 380d may cooperate or interface with the boiler controller to control the combustion in the combustion volume 322d. For example, signals from the boiler controller may be received at the combustion controller 380d (e.g., signals related to a desired or suitable heat output). Moreover, the combustion controller 380d may be coupled to the fuel valve and/or the blower, such as to control respective flows of fuel and oxidant into the combustion volume 322d. Hence, the combustion controller 380d may operate (directly or indirectly) the fuel valve and/or the blower based on the signals from the UV sensor(s) 381d, from the infrared sensor(s) 382d, from the boiler controller, or combinations thereof. For instance, controlling the fuel valve and the blower may produce a suitable and/or desired combustion and/or heat output.

As mentioned above, in an embodiment, the integrated combustion assembly 300d includes the ignition assembly 390d. For example, the ignition assembly 390d may include an annular holder 391d connected to an actuator arm 392d. Under some operating conditions, the actuator arm 392d may position the ignition assembly 390d at a location within the fuel and/or oxidant flow that is suitable for initially anchoring the flame in a manner that preheats the flame holder 330d (e.g., to a temperature of at least the auto-ignition temperature of the fuel and oxidant mixture injected into the combustion volume 322d). In some embodiments, the ignition assembly 390d may include an ignition mechanism. For example, the ignition mechanism may include a spark igniter, a heating element that may raise the temperature of the annular holder 391d to at least the auto-ignition temperature of the fuel and oxidant mixture, other suitable ignition mechanisms, and combinations of the foregoing.

In one or more embodiments, the actuator arm 392*d* may be adjustable relative to the fuel nozzle 340*d* and flame holder 330*d*. For example, the combustion controller 380*d* may control the position of the annular holder 391*d* relative to the flame holder 330*d* to anchor and/or advance the flame in the combustion volume 322*d* toward the flame holder 330*d* in a manner that initially raises the temperature of the flame holder 330*d* to an operating temperature thereof (e.g., at least auto-ignition temperature of the fuel and oxidant mixture). In some embodiments, the temperature of the flame holder 330*d* may be initially increased to a suitable operating temperature, and subsequently the ignition assembly 390*d* may be operated to move the annular holder 391*d* away from the fuel and oxidant flow. As such, the fuel and oxidant mixture may flow toward and/or to the flame holder 330*d* and may be ignited and/or anchored thereby. For example, the actuator arm 392*d* may be rotated or pivoted relative to the fuel nozzle 340*d* such that the annular holder 391*d* moves away from the stream of fuel entering and/or flowing in the combustion volume 322*d*. It should be appreciated that the flame may be anchored at a suitable location relative to the flame holder 330*d* with any number of suitable mechanisms. Moreover, in some embodiments, the flame holder 330*d* may be initially preheated (e.g., by a heating element), such that the initial combustion occurs at the flame holder 330*d*, which may also anchor the flame, as described above.

In other embodiments, the flame holder 330*d* may be preheated using electrical resistance heating. For example, a suitable wire may be threaded through apertures of the flame holder 330*d* and heat the flame holder 330*d* as electrical current passes through the wire.

While various aspects and embodiments have been disclosed herein, other aspects and embodiments are contemplated. The various aspects and embodiments disclosed herein are for purposes of illustration and are not intended to be limiting.

What is claimed is:

1. A method of installing a prefabricated integrated combustion assembly into a combustion chamber of a combustion system, the method comprising:
    disconnecting an initial fuel nozzle assembly of the combustion system from a fuel supply, wherein the combustion system is a conventional combustion system;
    removing the initial fuel nozzle assembly from the combustion chamber of the combustion system;
    inserting the prefabricated integrated combustion assembly into the combustion chamber of the combustion system, the prefabricated integrated combustion assembly including:
        a mounting plate mountable near a base of the combustion chamber,
        a fuel nozzle assembly attached to or integrated with the mounting plate, the fuel nozzle assembly including a fuel nozzle and an oxidant outlet configured to facilitate flow of an oxidant into the combustion chamber, the fuel nozzle being positioned inside the flow of the oxidant such that the flow of the oxidant flows around the fuel nozzle,
        one or more supports attached to or integrated with the mounting plate, and
        a perforated flame holder supported by the one or more supports and including a body having a plurality of apertures therein; and
    attaching the mounting plate of the prefabricated integrated combustion assembly near the base of the combustion chamber.

2. The method of claim 1 wherein the combustion system produces less $NO_x$ during operation than when the perforated flame holder is absent.

3. The method of claim 1 wherein the prefabricated integrated combustion assembly includes insulation at least partially wrapped around the one or more supports.

4. The method of claim 1 wherein the fuel nozzle assembly and the perforated flame holder are positioned at a predetermined distance and have a predetermined orientation relative to each other.

5. The method of claim 1 wherein the oxidant outlet is at least partially defined by a tubular member, and the fuel nozzle is at least partially positioned within the tubular member.

6. The method of claim 5 wherein the tubular member and the mounting plate are integrally formed with each other.

7. The method of claim 1 wherein the one or more supports define a pocket and the perforated flame holder is positioned at least partially in the pocket.

8. The method of claim 1 wherein the perforated flame holder is brazed to the one or more supports.

9. The method of claim 1 wherein the prefabricated integrated combustion assembly includes a cap securing the one or more supports and the perforated flame holder together.

10. The method of claim 1 wherein the prefabricated integrated combustion assembly includes a controller configured to be coupled to a fuel valve to control combustion in the prefabricated integrated combustion assembly.

11. The method of claim 10 wherein the prefabricated integrated combustion assembly includes one or more sensors coupled to the controller, and the controller is configured to control combustion in the prefabricated integrated combustion assembly at least partially based on one or more signals received from the one or more sensors.

12. The method of claim 10 wherein the prefabricated integrated combustion assembly includes an ignition assembly coupled to the controller, and wherein the controller is configured to operate the ignition assembly.

13. A method of installing a prefabricated integrated combustion assembly into a combustion chamber of a combustion system, the method comprising:
    disconnecting an initial fuel nozzle assembly of the combustion system from a fuel supply, wherein the combustion system is a conventional combustion system;
    removing the initial fuel nozzle assembly from the combustion chamber of the combustion system;
    inserting the prefabricated integrated combustion assembly into the combustion chamber of the combustion system, the prefabricated integrated combustion assembly including:
        a combustion controller,
        a mounting plate mountable near a base of the combustion chamber,
        a fuel nozzle assembly attached to or integrated with the mounting plate, the fuel nozzle assembly including a fuel nozzle and an oxidant outlet configured to facilitate flow of an oxidant into the combustion chamber, the fuel nozzle being positioned inside the flow of the oxidant such that the flow of the oxidant flows around the fuel nozzle,
        one or more supports attached to or integrated with the mounting plate, and a perforated flame holder supported by the one or more supports and including a body having a plurality of apertures therein;

operably coupling the combustion controller to a boiler controller, such that the combustion controller receives a required heat output from the boiler controller; and operably coupling the combustion controller to one or more of a fuel valve or a blower, wherein the combustion controller is configured to control an amount of fuel and the oxidant injected into the combustion chamber at least partially based on the required heat output received from the boiler controller.

14. The method of claim 13 wherein the prefabricated integrated combustion assembly includes an ignition assembly coupled to and controlled by the combustion controller.

15. The method of claim 13 wherein the combustion controller is configured to control one or more of the fuel valve, the blower, or an ignition assembly to preheat the perforated flame holder to an operating temperature.

16. The method of claim 13 wherein the combustion controller is configured to control one or more of the fuel valve, the blower, or an ignition assembly to anchor to the perforated flame holder a flame produced during combustion of fuel when the perforated flame holder is at an operating temperature.

17. An integrated combustion assembly for retrofitting a conventional combustion system, the integrated combustion assembly comprising:

a mounting plate mountable to a base of a combustion chamber of the conventional combustion system, the mounting plate including a mounting face and a back face;

a fuel nozzle assembly attached to or integrated with the mounting plate, the fuel nozzle assembly including a fuel nozzle having a tip thereof positioned at a predetermined distance from the mounting face of the mounting plate and an oxidant outlet configured to facilitate flow of an oxidant into the combustion chamber, the fuel nozzle being positioned inside the flow of the oxidant such that the flow of the oxidant flows around the fuel nozzle;

one or more supports attached to or integrated with the mounting plate and extending outward from the mounting face thereof;

a perforated flame holder supported by the one or more supports and including a body defining a plurality of apertures, the perforated flame holder being positioned at a predetermined distance from the mounting face of the mounting plate and from the tip of the fuel nozzle; and a combustion controller mounted to the mounting plate, the combustion controller operably coupled to a boiler controller and to one or more of a fuel valve or a blower, the combustion controller configured to receive a required heat output from the boiler controller, and further configured to control an amount of fuel and the oxidant injected into the combustion chamber at least partially based on the required heat output received from the boiler controller.

18. The integrated combustion assembly of claim 17, wherein the fuel nozzle assembly includes a tubular member defining the oxidant outlet, the tubular member being integrated with the mounting plate, and the fuel nozzle being attached to and positioned at least partially within the tubular member.

19. The integrated combustion assembly of claim 17, further comprising:

one or more sensors coupled to the controller;

wherein the controller is configured to control combustion in the integrated combustion assembly at least partially based on one or more signals received from the one or more sensors.

20. The integrated combustion assembly of claim 19 wherein the one or more sensors include one or more ultraviolet sensors configured to detect a combustion byproduct or one or more infrared sensors configured to sense a temperature of the combustion chamber.

\* \* \* \* \*